United States Patent [19]

McLinden et al.

[11] Patent Number: 4,687,588

[45] Date of Patent: Aug. 18, 1987

[54] REFRIGERANT MIXTURE OF TRICHLOROFLUOROMETHANE AND DICHLOROHEXAFLUOROPROPANE

[75] Inventors: Mark O. McLinden, Gaithersburg; David A. Didion, Cheverly, both of Md.; Calvin D. MacCracken, Englewood, N.J.

[73] Assignee: Calmac Manufacturing Corporation, Englewood, N.J.

[21] Appl. No.: 893,380

[22] Filed: Aug. 5, 1986

[51] Int. Cl.$^4$ .............................................. C09K 5/04
[52] U.S. Cl. ..................................... 252/67; 252/364; 252/DIG. 9; 62/114

[58] Field of Search ................... 252/67, 364, DIG. 9; 62/114

[56] References Cited

U.S. PATENT DOCUMENTS 4,344,292  8/1982  Rojey .................................... 62/114

Primary Examiner—Robert A. Wax
Attorney, Agent, or Firm—Charles J. Brown

[57] ABSTRACT

A refrigerant mixture consisting essentially of trichlorofluoromethane (R-11) and dichlorohexafluoropropane (R-216) which has a higher saturated vapor density than that of pure R-11 and which exhibits an azeotrope at approximately 74% by weight of R-11 and 26% by weight of R-216.

8 Claims, No Drawings

REFRIGERANT MIXTURE OF TRICHLOROFLUOROMETHANE AND DICHLOROHEXAFLUOROPROPANE

The invention described herein may be manufactured and used by or for the Government of the United States of America for all Governmental purposes without the payment of any royalty.

BACKGROUND OF THE INVENTION

Mixtures of liquids whose vapor and liquid phases in equilibrium have identical compositions are known as azeotropes. The boiling of such mixtures occurs at a constant temperature and therefore the components do not separate. Azeotropes find particular application as refrigerants because the composition of the liquid in the evaporator is always the same as the vapor boiling out of the evaporator and passing through the compressor.

There are two types of azeotropic mixtures, one in which the pressure of the mixture at a given temperature is less than the pressure at that temperature of either of its components. The other more common azeotrope is one in which the evaporating or condensing pressure at a given temperature is greater for the mixture than for either component alone or, equivalently, at a given pressure the temperature of the azeotrope is lower than that of either pure component. The latter is known as a maximum pressure (or minimum temperature) azeotrope and an example is the R-12/R-40 refrigerant described in U.S. Pat. No. 2,547,887 for use in a centrifugal compressor operated at relatively slow speed.

It is a principal purpose of this invention to provide a new refrigerant mixture having a higher saturated vapor density at a given temperature than that of either of its components alone, thus enabling a centrifugal compressor, or any other compressor which operates on the principle of converting kinetic energy of the vapor to potential energy, to operate over a greater lift without surging or other flow instabilities. A principal object is to provide a substantially azeotropic refrigerant which will permit an existing centrifugal compressor system designed only to chill water to operate at substantially lower temperatures and be capable of freezing ice, all without structural or electrical change to the compressor. Another advantage of the greater lift in chilling water is that operation can be at a higher condensing temperature and therefore an air-cooled dry condenser can be used instead of a wet cooling tower or evaporative sprayed condenser.

A further application of the mixture of the invention is to permit the use of standard centrifugal compressors in hotter or more humid climates than those in which they can now operate, both for chilling water and for making ice. The new refrigerant also can be used to cure surging in compressors in field operation which occurs when compressors cannot meet required lift conditions. Yet another feature of the invention is that it gives a wider latitude of operation under partial-load conditions when less refrigerant load is required but the same lift between evaporator and condenser pressures is still needed.

SUMMARY OF THE INVENTION

The invention provides a mixture consisting esentially of trichlorofluoromethane (R-11) and dichlorohexafluoropropane (R-216) which has a higher saturated vapor density than that of pure R-11. In particular the invention provides a substantially azeotropic mixture of about 50% to 95% by weight R-11 and about 5% to 50% by weight R-216. The invention also provides a method of achieving higher lift in a centrifugal compressor by evaporating a mixture consisting essentially of R-11 and R-216 and wherein the mixture has a higher saturated vapor density than that of pure R-11.

DESCRIPTION OF PREFERRED EMBODIMENT

Because of the many refrigerants now known and the infinite mass fractions possible when two are mixed in a binary system, the search for an azeotropic mixture of particular properties is arduous. Trichlorofluoromethane, $CCl_3F$ or R-11, is widely used in centrifugal compressors and additives to it were considered in the course of this invention. Since its boiling point was close to that of R-11, one additive given consideration was dichlorohexafluoropropane, $C_3Cl_2F_6$ or R-216, though it was not known that R-216 had ever previously been combined azeotropically or otherwise with any other refrigerant, much less R-11. Whether some combination of R-11 and R-216 would not only be azeotropic but would also operate at substantially greater exit pressure in a centrifugal compressor was even less predictable. An equation-of-state computer simulation generating various property data indicated that an azeotrope might exist with R-11 predominating over R-216.

Actual experimentation was then conducted by the addition to R-11 of R-216, and in particular the isomer designated as 1,2-dichlorohexafluoropropane. Normal boiling points for various percentages of R-11 and R-216 became lower as the R-216 weight concentration was increased, then came generally to a minimum at about 70% R-11 and then increased again, as indicated in Table 1, proving conclusively that an azeotrope exists.

TABLE 1

Normal Boiling Point of Mixtures of R-11 and R-216

| Composition | | Normal Boiling Point (F.) | |
|---|---|---|---|
| wt % R-11 | wt % of R-216 | Experimental | Calculated |
| 100 | 0 | 74.53 | 74.77 |
| 81.7 | 18.3 | 73.35 | 73.18 |
| 74.0 | 26.0 | — | 73.04 (azeotrope) |
| 71.5 | 28.5 | 73.09 | 73.05 |
| 65.7 | 34.3 | 73.04 | 73.17 |
| 30.6 | 69.4 | 74.93 | 77.45 |
| 18.6 | 81.4 | 81.36 | 81.48 |
| 0 | 100 | 94.10 | 94.59 |

The azeotrope was bracketed by a mixture of 81.7% R-11 which had a normal boiling point of 73.35 degrees F. and a mixture of 30.6% R-11 which had a normal boiling point of 74.93 degrees F. For this reason the azeotrope of the invention can be identified as one of the more common maximum pressure or minimum temperature types described previously. Although these data establish the existence of an azeotrope they do not permit the accurate determination of the precise composition of the azeotrope because of the extreme flatness of the boiling point curve with compositions near the azeotrope. For this reason, an equation-of-state computer simulation was used to correlate these data. The results of this correlation (shown in Table 1 as calculated normal boiling points) indicated that the lowest normal boiling point of 73.04 degrees F. was at 74% R-11. Therefore, at 74% by weight R-11 and 26% by weight R-216 an azeotrope was identified at which the mixture had a constant boiling point of 73.04 degrees F. at a pressure of one atmosphere. The equation-of-state calculates the saturated vapor density of the azeotrope to be 15% higher than that of R-11. It was also observed that the latent heat of vaporization at 32 degrees F. of the new azeotrope is about 73.0 BTU/lbm which is 11% less than that of R-11 at the same temperature, namely 82.0 BTU/lbm. Therefore, while the capacity of an existing centrifugal compressor per pound of refrigerant evaporated using the new azeotrope can be expected to be somewhat less than with R-11 alone, that is more than offset by the advantage of a higher lift capability and mass flow rate in the compressor resulting largely from the higher vapor density of the mixture as compared to pure R-11. It is also to be noted that neither R-11 nor R-216 is flammable in air. R-216 has only two strongly bonded chlorine atoms per molecule (comprising 32% of the total weight) making it environmentally more acceptable than R-11 with its three strongly bonded chlorine atoms (comprising 77% of the total weight of the R-11 molecule).

It is recognized in this art that there are a range of compositions containing the same components in different proportions which are true azeotropes at different temperatures and pressures (see U.S. Pat. No. 4,101,436). Experience also shows that there is a range of compositions containing the same components as the azeotrope which are not exactly azeotropic but which exhibit essentially equivalent properties for refrigeration purposes and other applications. Furthermore even measurable deviations from azeotropic behavior can be inconsequential in a refrigeration system. It is possible to operate an air conditioning or refrigeration or heat pump system with the mixture in a nonazeotropic state with no particular harm. Although such a system may or may not be designed to take advantage of the nonazeotropic characteristics of the mixture of the invention, (e.g. non-constant temperature and liquid and vapor during an evaporation or condensation process) for all practical purposes the system will behave as though the mixture was a pure refrigerant with a unique set of properties different from any other refrigerant. Since increased density is the underlying principle upon which is based the ability of the mixture of the invention to improve performance of a centrifugal-type compressor, the scope of the invention includes all composition ranges of R-11 and R-216 which exhibit a higher saturated vapor density than that of pure R-11, i.e., from 1% to 93% R-216 by weight. As shown in Table 2, the saturated vapor density increases with increasing R-216 content, being 15% higher than pure R-11 at the azeotropic composition and reaching a maximum density which is 18% higher than pure R-11 at a composition of 42% R-216. As the percentage of R-216 is increased above 42%, the density decreases but remains above that of pure R-11 up to a composition of about 93% R-216 and 7% R-11.

TABLE 2

Saturated Vapor Density of Mixtures of R-11 and R-216 at 32 Degrees F.

| Composition | | Vapor Density |
|---|---|---|
| wt. % R-11 | wt. % R-216 | (lb/ft) |
| 100 | 0 | 0.155 |
| 90 | 10 | 0.164 |
| 80 | 20 | 0.173 |
| 74 | 26 | (azetrope) 0.178 |
| 70 | 30 | 0.180 |
| 60 | 40 | 0.183 |
| 58 | 42 | (max den) 0.1832 |
| 50 | 50 | 0.182 |
| 40 | 60 | 0.177 |
| 30 | 70 | 0.171 |
| 20 | 80 | 0.163 |
| 10 | 90 | 0.156 |
| 7 | 93 | (same density as R-11) 0.155 |
| 0 | 100 | 0.149 |

Therefore the invention includes within its scope not only the exact azeotrope of this R-11/R-216 mixture but any mixture thereof wherein the density is greater than that of R-11 because all such mixtures will improve the pressure lift capabilities of centrifugal-type compressors or expand the range of operation of a centrifugal-type refrigeration compressor. Centrifugal-type compressors are those which increase pressure through the principle of accelerating and then converting the kinetic energy of the vapor to potential energy (i.e., a higher pressure) by reducing its velocity. It is also to be noted that all four known isomers of R-216 can be expected to serve in the invention, namely 1,1- and 1,3- and 2,2- as well as 1,2-dichlorohexafluoropropane.

We claim:

1. A mixture consisting essentially of trichlorofluoromethane (R-11) and dichlorohexafluoropropane (R-216) and which has a higher saturated vapor density than that of pure R-11.

2. A mixture consisting essentially of 1% to 93% by weight dichlorohexafluoropropane (R-216) and the remainder trichlorofluoromethane R-11.

3. A mixture consisting essentially of about 50% to 95% by weight of trichlorofluoromethane (R-11) and about 5% to 50% by weight of dichlorohexafluoropropane (R-216) and which is substantially azeotropic.

4. A mixture according to claim 3 consisting essentially of about 74% by weight of trichlorofluoromethane (R-11) and about 26% by weight of dichlorohexafluoropropane (R-216).

5. A method of achieving a higher lift in a centrifugal-type compressor which comprises evaporating a mixture consisting essentially of trichlorofluoromethane (R-11) and dichlorohexafluoropropane (R-216) and which mixture has a higher saturated vapor density than that of pure R-11.

6. A method according to claim 5 wherein the mixture consists essentially of 1% to 93% by weight dichlorohexafluoropropane (R-216) and the remainder trichlorofluoromethane (R-11).

7. A method according to claim 5 wherein the mixture consists essentially of about 50% to 95% by weight of trichlorofluoromethane (R-11) and about 5% to 50% by weight of dichlorohexafluropropane (R-216).

8. A method according to claim 5 wherein the mixture consists essentially of about 74% by weight of trichlorofluormethane (R-11) and about 26% by weight of dichlorohexafluoropropane (R-216).

* * * * *